United States Patent [19]

Mabrey

[11] Patent Number: 5,188,245
[45] Date of Patent: Feb. 23, 1993

[54] FULL HEIGHT CARRIER FOR HORIZONTAL CAROUSEL

[75] Inventor: Gerald B. Mabrey, Barrington, Ill.

[73] Assignee: White Consolidated Industries, Inc., Cleveland, Ohio

[21] Appl. No.: 710,544

[22] Filed: Jun. 5, 1991

[51] Int. Cl.$^5$ ............................................... A47F 5/00
[52] U.S. Cl. .................................... 211/122; 198/799; 211/1.52; 312/134
[58] Field of Search ............... 198/799, 836; 211/1.52, 211/1.57, 122; 312/97, 132, 134, 135, 268

[56] References Cited

U.S. PATENT DOCUMENTS

| | | |
|---|---|---|
| 3,039,614 | 6/1962 | Rutkovsky et al. |
| 3,368,688 | 2/1968 | Weiss et al. |
| 3,780,852 | 12/1973 | Weiss et al. ........................ 211/122 |
| 4,422,554 | 12/1983 | Lichti .............................. 211/122 X |
| 4,531,789 | 7/1985 | Iemura et al. |
| 4,625,874 | 12/1986 | Abe et al. |

*Primary Examiner*—Robert W. Gibson, Jr.
*Attorney, Agent, or Firm*—Pearne, Gordon, McCoy & Granger

[57] ABSTRACT

A top drive horizontal carousel for a full height carrier including generally horizontal and coextensive upper and lower guides and associated upper and lower support assemblies. The upper and lower support assemblies include a series of guidance points or carrier pins which define a first vertical plane for each of the carriers. The support assemblies are attached to the back of a corresponding carrier via horizontally directed extensions which cross the first vertical plane. The back of the carrier forms a second vertical plane, outwardly disposed from the first vertical plane, allowing the carrier to extend above the upper guide and below the lower guide to provide for a carrier whose height is not limited by the space between the upper and lower guides.

16 Claims, 3 Drawing Sheets

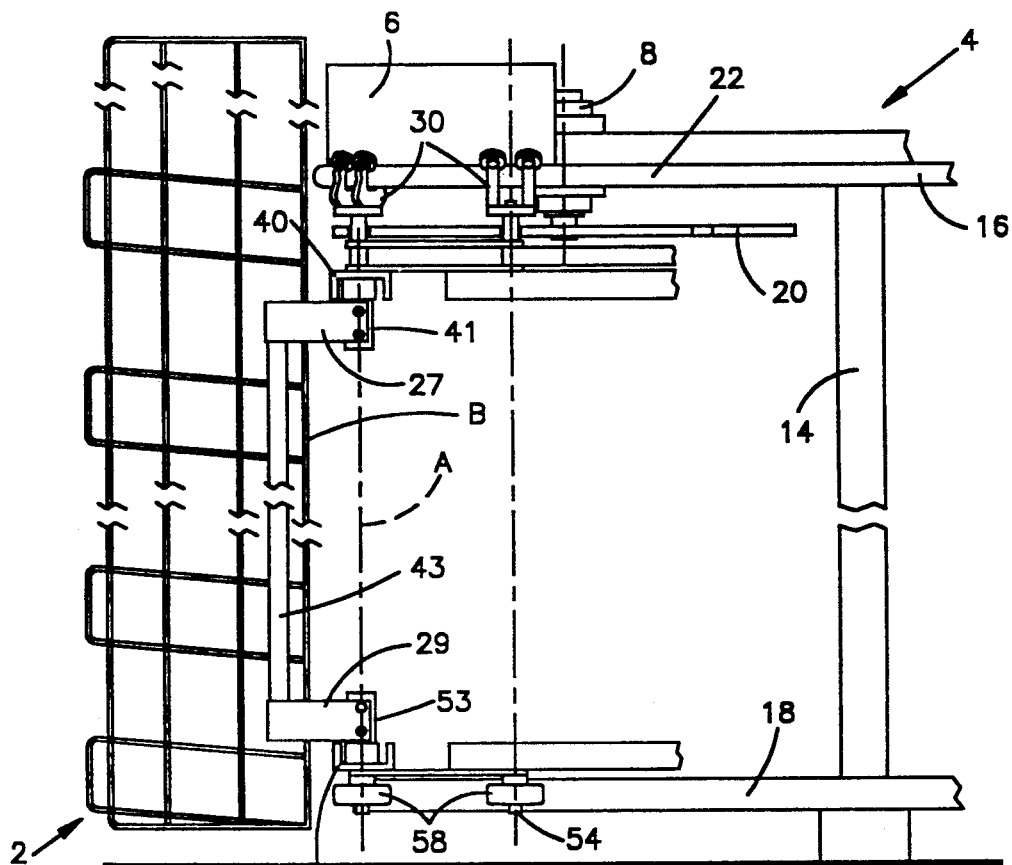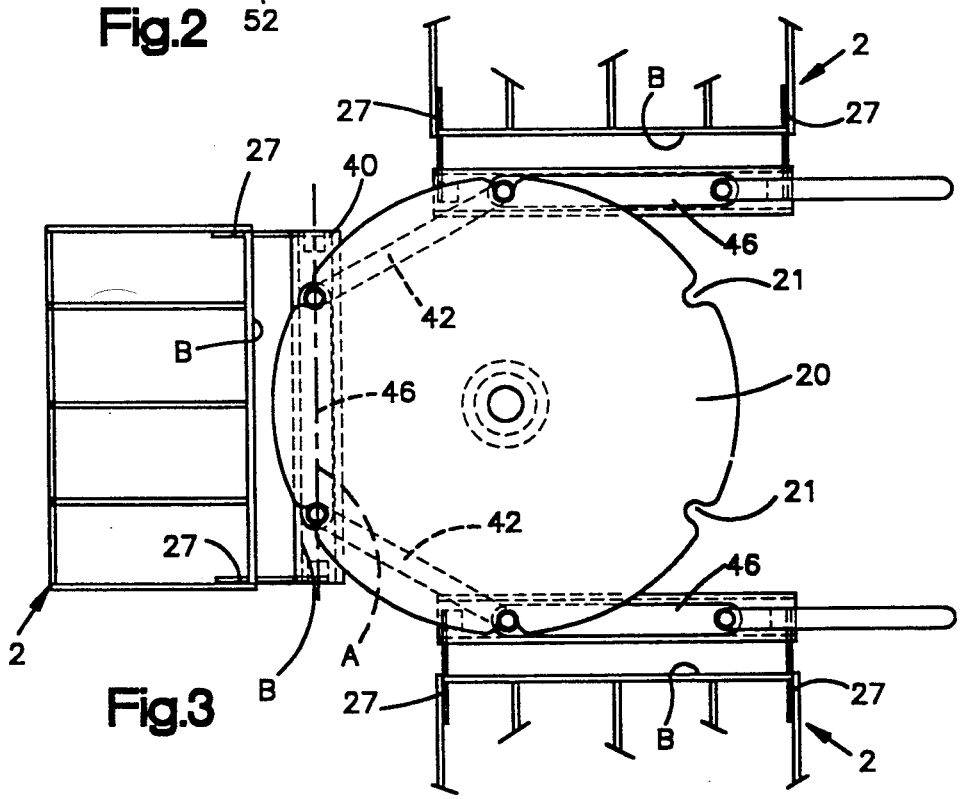

ns,245

FULL HEIGHT CARRIER FOR HORIZONTAL CAROUSEL

BACKGROUND OF THE INVENTION

The present invention relates to an improved apparatus for the storage and retrieval of articles of manufacture of the type normally stored in carriers, and more particularly to a full-height carrier for a top-drive horizontal carousel.

Horizontal rotary carousels for the transportation of metal carriers are well known in the art. Normally, such carousels have either top or bottom drive units which, via a transmission device, move the carriers, by way of upper and lower support assemblies, along upper and lower guide assemblies. The movement of the carriers follows a generally elliptical path which is defined by the shape of guide assemblies, which is common in carousels of this type.

The guides typically have a pair of semicircular regions mounted at respective ends of a substantially straight section. In the top drive units at least one of the semicircular regions includes means to transfer motion from the drive unit to the support assemblies associated with the respective carrier. This transfer means normally includes at least one notched turntable or sprocket which is rotatably engaged to the drive unit.

The upper support assemblies each generally include a carrier sleeve which the notched turntable engages to force the support assemblies and the carriers associated therewith to move along the guides. The carrier sleeve is adapted to receive a vertically extending pin which mounts the carrier on the support assembly. The individual pins are interconnected by pivotal link members, ensuring uniform movement of the support assemblies and associated carriers. Below the pivotal link members each pair of pins is connected to a supporting bar to support an associated carrier. In this way, motion is imparted equally upon each support assembly via the pivotal link members while the associated carriers have a range of motion independent from each other, which is necessary at the semicircular regions of the guides.

The bottom of each carrier is typically provided with a lower support assembly consisting of simple wheel or caster mechanisms which ride on the outwardly directed face of the lower guide to keep the carrier in correct vertical alignment. The wheels are attached, in pairs, to a mounting bar at the bottom surface of the carrier. The weight of the carrier is carried almost exclusively by the upper support assemblies, the wheels merely being provided to ensure correct alignment of the carrier.

Thus, in the conventional carousel the carrier is above the lower guide and below the upper guide. In essence, the carrier is trapped between the upper and lower guides of the carousel, and the size of the carrier itself is limited by the space between the upper and lower guides.

Therefore, conventional carousels of this type suffer from the disadvantage that the areas above the upper guide and below the lower guide are normally not utilized by the carriers because of structural and spatial constraints. Thus, these carousels are incapable of using the available space in the most efficient and convenient way possible, contrary to the express purpose of devices of this type.

SUMMARY OF THE INVENTION

An object of the present invention is to provide a novel carrier attachment device which enables the full utilization of space above and below the carousel superstructure. In low ceiling applications, the carrier height can extend from the floor to the ceiling, something which is not possible with devices presently known in the art.

In accordance with an object of the invention, the present invention is provided with an upper carrier channel located intermediate the upper support assembly and the carrier. The upper carrier channel is attached to the upper support assembly via a pair of hinge members or carrier pins. The upper carrier channel attaches, via a pair of extensions, to the side walls of the carrier a distance below the top of the carrier.

Further in accordance with an object of the invention, the present invention is provided at the lower guide of the carousel with a lower carrier channel located intermediate the lower support assembly and the carrier. The lower carrier channel is attached to the lower support assembly via a pair of hinge members or carrier pins. The lower carrier channel attaches, via a pair of extensions, to the side walls of the carrier a distance above the bottom of the carrier.

Further in accordance with an object of the present invention, a plurality of carrier pins for each carrier, located generally in-line with the upper and lower guides, define a first generally vertical plane. The back wall of the carrier defines a second generally vertical plane located outboard of the first vertical plane. Hence, the carrier is disposed outwardly a distance from the upper and lower guides, allowing the carrier to extend above the upper guide and below the lower guide.

In accordance with the objects of the present invention, the carrier is entirely outside the plane defined by the carrier pins associated with the upper and lower support assemblies of a given carrier. The upper and lower carrier channels and associated extensions free the carrier from the spatial constraints of the carousel and, thus, the height of the carriers is not determined by the space between the upper and lower guides, as in the prior art. Hence, the carriers of the present invention are capable of having a height exceeding the height of the carousel, and can go from floor to ceiling, making use of space which otherwise is not usable.

BRIEF DESCRIPTION OF THE DRAWINGS

A fuller understanding of the invention may be had by referring to the following description and claims taken in conjunction with the accompanying drawings, wherein:

FIG. 2 is a side elevational view of the carousel and carrier of the present invention;

FIG. 3 is a top plan view of the notched sprocket and associated carriers, with drive unit removed;

DETAILED DESCRIPTION OF THE PREFERRED EMBODIMENT

Figure 1:
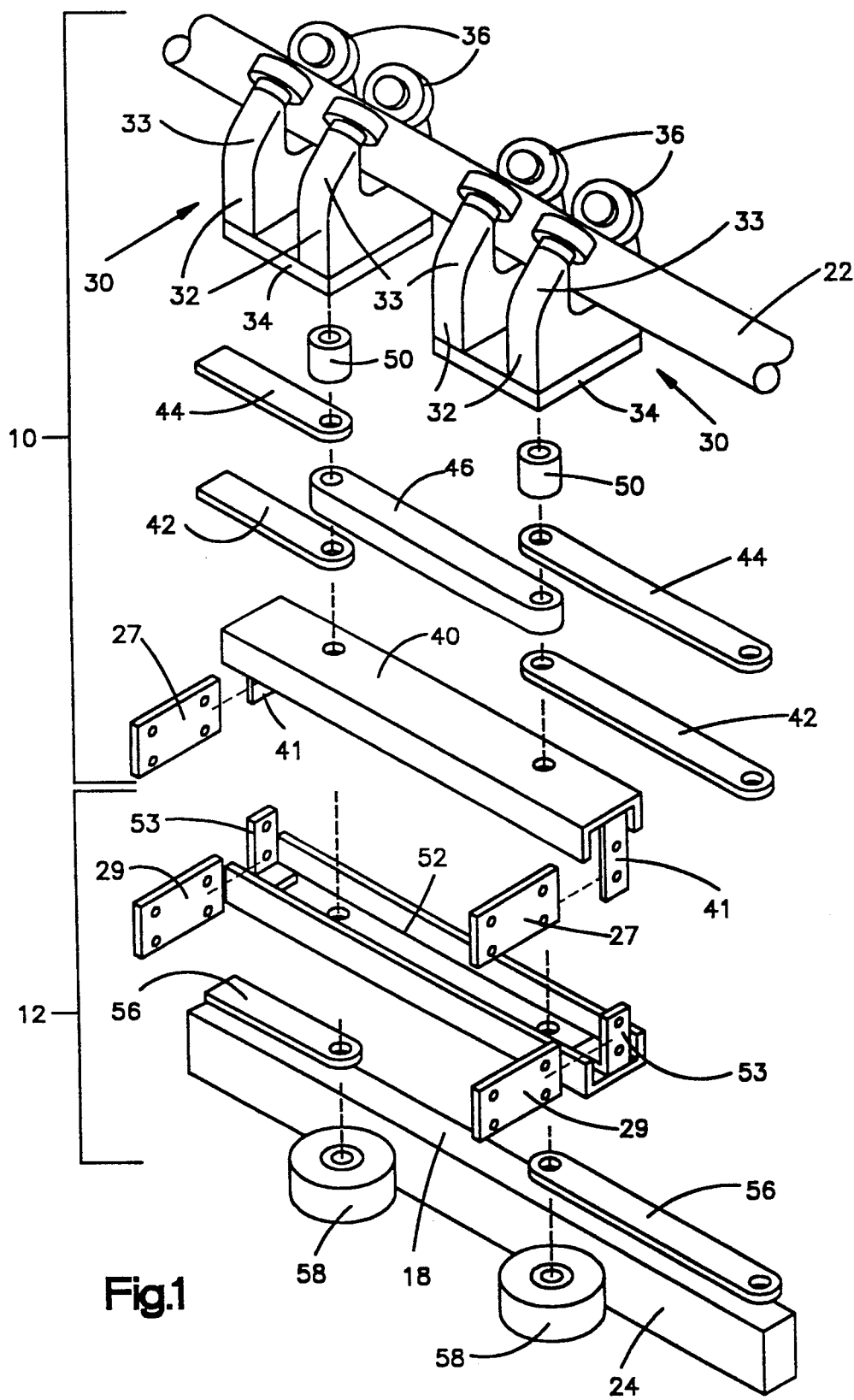
FIG. 1 is an exploded perspective view of the support assemblies and hardware for mounting and connecting the carriers to the carousel, absent the carrier.

With reference to FIG. 2, the carrier 2 and carousel 4 of the present invention are depicted. The carousel 4 includes a motor 6, a frame 14, a drive means 8, and a guide means including upper and lower support assemblies 10, 12 and upper and lower guides 16, 18. The motor 6, which is in engagement with the drive means 8, is mounted to the frame 14 on the top of the carousel superstructure, above the upper guide 16.

The drive means 8, as best shown in FIGS. 2 and 3, includes a sprocket 20 which is rotated by means of the motor 6. The sprocket 20 drives a series of carrier bins 2 about the generally elliptical path of the carousel, as will be described hereafter. The upper and lower guides 16, 18 each have two parallel linear portions and two semicircular portions at the ends of the linear portions, defining a generally elliptical path about which the carriers move. The upper guide 16 includes a generally tubular member 22 which provides support for the upper support assemblies 10 while the lower guide 18 provides a generally flat, outwardly directed surface 24 against which a series of rollers 58 associated with the lower support assemblies 12 ride, as will be described hereafter.

Figure 5:
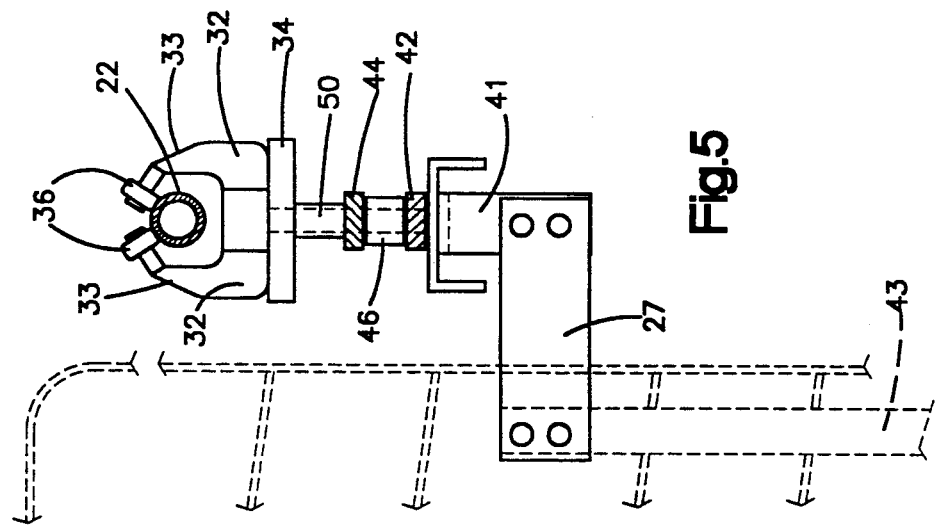
Figure 4:
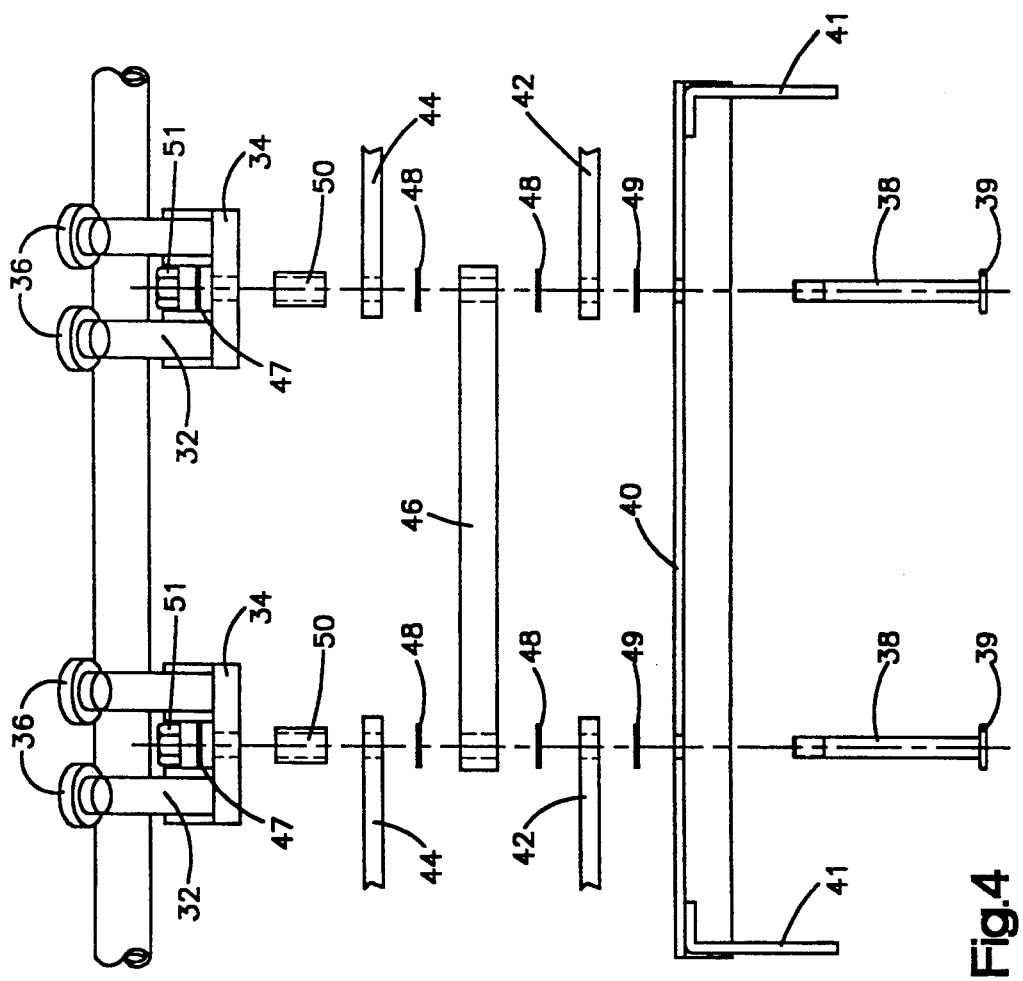
FIG. 4 is an exploded front elevational view of the upper support assembly of the present invention; and, FIG. 5 is an assembled elevational view of the upper support assembly of the present invention.

With particular reference to FIGS. 1, 4, and 5, the upper support assembly 10 of the present invention will now be described. The upper support assembly 10 includes a tandem yoke member 30 having two pairs of arms 32 which extend upwardly from a generally planar lower baseplate 34. Each of the arms 32 have an inwardly directed terminal section 33 which is provided with a wheel or caster 36 at the extreme end thereof. The tandem yoke member 30 generally surrounds the tubular portion 22 of the upper guide 16, the wheels 36 riding on the tube 22 to facilitate movement of the support assemblies 10 about the carousel 4.

An upper carrier pin 38 extends through and interconnects an upper carrier channel 40, upper and lower tie bars 44, 42, a tie bar stabilizer 46, a carrier sleeve 50 and the baseplate 34 of the tandem yoke 30, as best shown in FIGS. 4 and 5. The upper carrier channel 40, which is adapted to attach to horizontal extensions 27 which hold and support the carrier 2 of the present invention, as described hereafter, provides a pair of generally circular openings, each adapted to accept an upper carrier pin 38. The upper carrier pin 38 has a flange or headed portion 39 which, when the pin is completely installed, rests against the bottom surface of the upper carrier channel 40, supporting the upper carrier channel and associated carrier 2.

The tie bar stabilizer 46, which is provided to connect tandem yoke members 30 which are associated with a common carrier 2, provides a pair of cylindrical openings, one adjacent each terminal end of the stabilizer 40, to accept a carrier pin 38. Each end of the tie bar stabilizer 46 is sandwiched between a pair of generally annular bearings 48 and the ends of the tie bars 42, 44. Each of the tie bars, one above 44 and one below 42 each end of the tie bar stabilizer 46, provide cylindrical holes which accept the carrier pin 38. Between the bottom surface of the lower tie bar 42 and the upper surface of the upper carrier channel 40 is provided a generally annular bearing 49 through which the carrier pin 38 extends. Therefore, as clearly shown in FIGS. 1 and 4, each tie bar stabilizer 46 is associated with four tie bars, two at each end.

Intermediate the upper surface of the upper tie bar 44 and the bottom surface of the baseplate 34 is provided a generally cylindrical carrier sleeve 50. The carrier sleeve, which defines a cylindrical passage adapted for receipt of the carrier pin 38, links the tie bar 44 to the tandem yoke member 30 and provides an engagement surface for the notched openings 21 of the sprocket 20, as will be hereafter described.

The baseplate 34 of the tandem yoke member 30 provides a generally circular hole to accept the upwardly directed carrier pin 38. The terminal end of the carrier pin extends through a generally annular bearing 47 mounted on the top of the baseplate 34 and threadably engages a nut 51 to support the pin 38 from the baseplate 34. In this fashion, as shown best in FIG. 5, the tandem yoke member 30 is attached to the upper carrier channel 40 and rolls on the upper guide 16.

Turning to FIG. 2, there is shown the tandem yoke members 30 and carrier 2 wherein the upper carrier channel 40 is generally horizontal, extending directly beneath tandem yoke members associated with a common carrier. The upper carrier channel 40 is provided with a pair of downwardly extending tabs or ears 41 at the outwardly spaced edges thereof. Each of these tabs 41 is fixed by screws or similar attachment means to a horizontal extension 27 which connects the upper carrier channel to a metal band 43 which runs along the outside of the carrier. This band 43 is typically integral with the carrier, being spot welded at various points along the vertical side of the carrier. The lower end of each of the metal bands 43 is attached to an extension 29 associated with a lower carrier channel 52, to be described hereafter with reference to the lower guide 18 and the lower support assembly 12.

The lower carrier channel 52 has a pair of upwardly directed tabs or ears 53 at the outwardly spaced edges thereof. Each of these tabs 53 is fixed by screws or similar attachment means to a horizontal extension 29 which connects the bottom carrier channel 52 to the metal band 43 associated with the carrier 2. The lower carrier channel 52 is generally identical to the upper carrier channel 40, having a generally planar surface which defines a pair of holes for receipt of a lower carrier pin 54. The lower carrier pin 54 is downwardly directed, the head of which is in engagement with the upper surface of the lower carrier channel 52. Immediately below the lower carrier channel 52 is provided a set of tie bars 56 for linking the carrier with adjacent carriers. The tie bars 56, provide holes for the receipt of the carrier pin 54.

Near the terminal end of the carrier pin, immediately below the tie bar 56, the lower support assembly 12 provides a wheel or roller 58. The wheel 58 rides along the outwardly directed, substantially planar surface 24 of the lower guide 18 as the carrier 2 moves around the elliptical carousel.

The upper and lower carrier pins 38, 54 for a carrier 2 define a first vertical plane, identified as A in FIG. 2. The rear wall of the carrier defines a second vertical plane B outwardly displaced from the first vertical plane A. The upper and lower carrier channels 40, 52 and corresponding extensions 27, 29 free the carrier from interference with the upper and lower guides 16, 18, allowing the carrier to extend above the upper guide 16 and below the lower guide 18, as clearly shown in FIG. 2.

The operation of the present invention will hereafter be described with reference to the above description and drawings. When the carousel 4 is in operation, the motor 6 causes the sprocket 20 to rotate. As the sprocket 20 rotates, the notched openings 21 engage the carrier sleeves 50 associated with the upper support assemblies 10, causing the carriers 2 to move about the carousel 4. As shown in FIG. 3, the sprocket 20 engages the carrier sleeve 50 generally throughout at least one of the semicircular regions of the elliptical carousel.

Associated with each carrier sleeve 50 is a pair of tie bars 42, 44. Each of the tie bars 42, 44 extend between adjacent carriers, linking the carriers such that motion imparted upon one carrier due to engagement of the carrier sleeve 50 with the sprocket 20 is imparted upon all of the carriers, forcing the carriers to move uniformly about the carousel. The tie bar stabilizer 46 extends between and connects upper support assemblies 10 associated with a common carrier 2 to help stiffen the carrier and cause the pair of support assemblies 10 to move as a unit around the carousel.

The upper and lower carrier channels 40, 52 extend generally horizontally between, and slightly beyond, each of their respective pair of carrier pins 38, 54, intersecting and crossing the first vertical plane A defined by the upper and lower carrier pins 38, 54. The carriers are joined to the upper and lower carrier channels 40, 52 at a location outwardly displaced from the first vertical plane A defined by the upper and lower carrier pins 38, 54. By locating the carriers at this position relative to the carousel superstructure, the carrier height is not determined by the space available between the upper and lower guides 16, 18.

Hence, the bottom of the carrier 2 can be positioned below the lower guide 18, generally as close to the floor as desired, which normally is within an inch or so. Also, the top of the carrier 2 can be positioned above the upper guide 16. In low-ceiling applications, the top of the carrier can be within an inch or so of the ceiling. Therefore, it is possible with the carousel 4 and carrier 2 of the present invention to increase the available storage space provided by a rotary carousel of this type, in some applications allowing floor-to-ceiling utilization of space.

It is clear that the present description is provided merely to illustrate the preferred embodiment of the present invention, the invention being capable of design in several different ways which are defined by the appended claims. For example, although the present invention is directed towards a top drive horizontal carousel 4 which drives the carriers 2 about the elliptical path via a rotary turntable 20 which contacts the carriers at their upper support assemblies 10, it is clear that the carousel could be either top or bottom drive and that drive means could contact either or both of the upper or lower support assemblies without departing from the inventive features of the present invention. Naturally, if the lower support assemblies were solely engaged for movement of the carriers, the upper support assemblies would typically have to hook behind or otherwise grasp the upper guide in order to prevent the carriers from tipping over. Furthermore, it is clear that the upper and lower carrier channels and associated extensions could easily be formed as one piece without departing from the scope of the present invention as defined by the following claims.

What is claimed is:

1. A rotary carousel comprising:
   upper and lower guide means;
   a carrier guided by said upper and lower guide means in a closed path;
   drive means to drive said carrier along said closed path;
   said carrier having at least three guidance points on said upper and lower guide means, said three guidance points being other than in a straight line to establish a first generally vertical plane;
   said carrier having a generally planar vertical rear wall, said rear wall defining a second generally vertical plane, said second vertical plane being generally parallel to but outwardly displaced from said first vertical plane, said carrier having an upper terminal portion which extends above said upper guide means.

2. A rotary carousel according to claim 1, wherein said carrier includes a lower terminal portion which extends below said lower guide means.

3. A rotary carousel according to claim 1, wherein said upper guide means further comprises an upper guide and an upper support assembly, said upper support assembly being guided by said upper guide.

4. A rotary carousel according to claim 3, wherein said lower guide means further comprises a lower guide and a lower support assembly, said lower support assembly being guided by said lower guide.

5. A rotary carousel according to claim 3, wherein said upper guide comprises a tube-shaped member, said tube-shaped member supporting said upper support assembly.

6. A rotary carousel according to claim 5, wherein said upper support assembly comprises engagement means which engage said tube-shaped member of said upper guide means.

7. A rotary carousel according to claim 6, wherein said engagement means includes a wheel.

8. A rotary carousel according to claim 4, wherein said lower support assembly further comprises a member engaging said lower guide, keeping said carrier in a desired alignment.

9. A rotary carousel according to claim 4, wherein said engaging member is a wheel.

10. A rotary carousel according to claim 4, further comprising an upper and lower carrier channel, said upper carrier channel being located intermidiate said upper support assembly and said carrier and said lower carrier channels being located intermediate said lower support assembly and said carrier, said upper carrier channel being attached to said upper support assembly by a first attachment means and said lower carrier channels being attached to said lower support assembly by a second attachment means.

11. A rotary carousel according to claim 10, wherein said first and second attachment means include a hinge member.

12. A rotary carousel according to claim 10, wherein said hinge member is a carrier pin.

13. A rotary carousel according to claim 10, wherein said first and second attachment means define said guidance points.

14. A rotary carousel according to claim 10, wherein said upper and lower carrier channels are generally planar, extending from said first vertical plane to said second vertical plane.

15. A rotary carousel according to claim 10, wherein said upper and lower carrier channels are generally planar and intersect said first and second vertical planes.

16. A rotary carousel comprising:

a frame body comprised of planar, coextensive upper and lower guides, said upper and lower guides defining a closed path about which a plurality of carriers move;

a plurality of upper and lower support assemblies, said upper support assemblies being guided by said upper guide and said lower support assemblies being guided by said lower guide, each of said upper and lower support assemblies including a carrier pin;

each of said carriers being associated with a plurality of carrier pins, said plurality of carrier pins defining a first vertical plane for each of said carriers;

each of said carriers having a generally planar vertical rear wall, a pair of vertical side walls and an open front, said rear wall defining a second vertical plane parallel to but outwardly spaced from said first vertical plane, said rear and side walls each having an upper and lower terminal portion defining upper and lower planes, said upper plane being defined by the upper terminal portion of said rear and side walls and said lower plane being defined by the lower terminal portion of said rear and side walls, said upper plane of said carrier being disposed vertically above said upper guide and said lower plane of said carrier being disposed vertically below said lower guide.

* * * * *

UNITED STATES PATENT AND TRADEMARK OFFICE
CERTIFICATE OF CORRECTION

PATENT NO. : 5,188,245

DATED : February 23, 1993

INVENTOR(S) : Gerald B. Mabrey

It is certified that error appears in the above-identified patent and that said Letters Patent is hereby corrected as shown below:

```
Column 6, Claim 9, line 41, delete "4" and insert
--8--.

Column 6, Claim 10, line 45, delete "intermidiate"
and insert --intermediate--.
```

Signed and Sealed this

Thirtieth Day of November, 1993

Attest:

BRUCE LEHMAN

*Attesting Officer*  *Commissioner of Patents and Trademarks*